US012665692B2

(12) United States Patent
Wang et al.

(10) Patent No.: US 12,665,692 B2
(45) Date of Patent: Jun. 23, 2026

(54) OPTICAL ADD DROP MULTIPLEXERS WITH ASYMMETRICAL FILTERING

(71) Applicant: Equinix, Inc., Redwood City, CA (US)

(72) Inventors: Qiang Wang, San Carlos, CA (US); Balakrishnan Sridhar, Ellicott City, MD (US); Rao Gangadhara Mohan Lingampalli, San Jose, CA (US); Pradeep Swargam, San Jose, CA (US); Iwan Kartawira, San Jose, CA (US); Manveer Singh, Tracy, CA (US)

(73) Assignee: Equinix, Inc., Redwood City, CA (US)

( * ) Notice: Subject to any disclaimer, the term of this patent is extended or adjusted under 35 U.S.C. 154(b) by 348 days.

(21) Appl. No.: 18/412,077

(22) Filed: Jan. 12, 2024

(65) Prior Publication Data

US 2025/0233681 A1 Jul. 17, 2025

(51) Int. Cl.
*H04J 14/02* (2006.01)

(52) U.S. Cl.
CPC ........ *H04J 14/021* (2013.01); *H04J 14/0204* (2013.01)

(58) Field of Classification Search
CPC ............................ H04J 14/021; H04J 14/0204
See application file for complete search history.

(56) References Cited

U.S. PATENT DOCUMENTS 6,647,209 B1 * 11/2003 Boord .................. G02B 6/2793
398/87
8,064,768 B2 11/2011 Ji et al.

8,165,468 B2 * 4/2012 Boduch .............. H04J 14/0295
398/79
8,306,425 B2 11/2012 Yang et al.
8,861,966 B2 10/2014 Zhu et al.
8,923,698 B2 * 12/2014 Xia ..................... H04L 27/2697
398/83

(Continued)

FOREIGN PATENT DOCUMENTS

WO 2011058547 A1 5/2011

OTHER PUBLICATIONS

Extended Search Report from counterpart European Application No. 24216310.3 dated May 12, 2025, 11 pp.

(Continued)

*Primary Examiner* — Kenneth N Vanderpuye
*Assistant Examiner* — Asif Shameem
(74) *Attorney, Agent, or Firm* — Shumaker & Sieffert, P.A.

(57) ABSTRACT

This disclosure describes techniques for Optical Add Drop Multiplexers (OADMs) that apply asymmetrical filtering to allow for individual channels within a channel group to be independently added/dropped or passed through. In one example, an optical add-drop multiplexer includes a first input port configured to receive an input signal having a first wavelength channel, a second wavelength channel, and a third wavelength channel; a demultiplexer having a first filter configured to: pass the first wavelength channel and the second wavelength channel, and filter the third wavelength channel; a multiplexer having a second filter configured to: pass the second wavelength channel and the third wavelength channel, and filter the first wavelength channel; and a first output port configured to output an output signal comprising the second wavelength channel of the input signal.

20 Claims, 11 Drawing Sheets

(56) References Cited

U.S. PATENT DOCUMENTS

| | | | | |
|---|---|---|---|---|
| 10,958,993 | B2 | 3/2021 | Swinkels et al. | |
| 11,063,683 | B1 | 7/2021 | Jones et al. | |
| 11,196,504 | B1 | 12/2021 | Frankel et al. | |
| 11,553,259 | B2 | 1/2023 | Frankel et al. | |
| 2003/0175030 | A1* | 9/2003 | Chen .................. | H04J 14/0209 |
| | | | | 359/489.09 |
| 2009/0180779 | A1 | 7/2009 | Boduch et al. | |
| 2010/0329686 | A1 | 12/2010 | Frankel | |
| 2012/0183294 | A1 | 7/2012 | Boertjes et al. | |

OTHER PUBLICATIONS

Joo et al., "1-Fiber WDM Self-Healing Ring With BidirectionalOptical Add/Drop Multiplexers", IEEE Photonics Technology Letters, vol. 16, No. 2, IEEE, Feb. 29, 2004, 683-685 pp.

First Examination Report from counterpart Australian Application No. 2024270622 dated Nov. 12, 2025, 3 pp.

"Arrayed Waveguide Grating," Wikipedia, retrieved from https://en.wikipedia.org/wiki/Arrayed_waveguide_grating, last modified Jun. 15, 2023, 2 pp.

"ROADM Tutorial Part 4 of 4," Youtube, https://www.youtube.com/watch?v=9Q5KMITxLbk, Jul. 6, 2010, 1 pp.

"What is OADM (Optical Add Drop Multiplexer)?," retrieved from https://community.fs.com/article/oadm-optical-add-drop-multiplexer-tutorial.html, Last updated on Dec. 21, 2023, 6 pp.

Filer et al., "N-degree ROADM Architecture Comparison: Broadcastand-Select versus Route-and-Select in 120 GB/s DP-QPSK Transmission Systems," OFC 2014, Mar. 9-13, 2014, 3 pp.

Kundrat et al., "Opening up ROADMs: a Filterless Add/Drop Module for Coherent-Detection Signals," Journal of Optical Communications and Networking, vol. 12, No. 6, Jun. 2020, pp. C41-C49.

Lee et al., "Sagnac Interferometer Based Flat-Top Birefringent Interleaver," Optics Express, vol. 14, No. 11, May 29, 2006, 8 pp.

Pan et al., "Real-Time ROADM Filtering Penalty Characterization and Generalized Precompensation for Flexible Grid Networks," IEEE Photonics Journal, vol. 9, No. 3, Jun. 2017, 11 pp.

Pulikkaseril et al., "Spectral Modeling of Channel Band Shapes in Wavelength Selective Switches," Optics Express, vol. 19, No. 9, Apr. 25, 2011, pp. 8458-8470.

Response to Extended Search Report dated May 12, 2025, from counterpart European Application No. 24216310.3 filed Dec. 16, 2025, 56 pp.

* cited by examiner

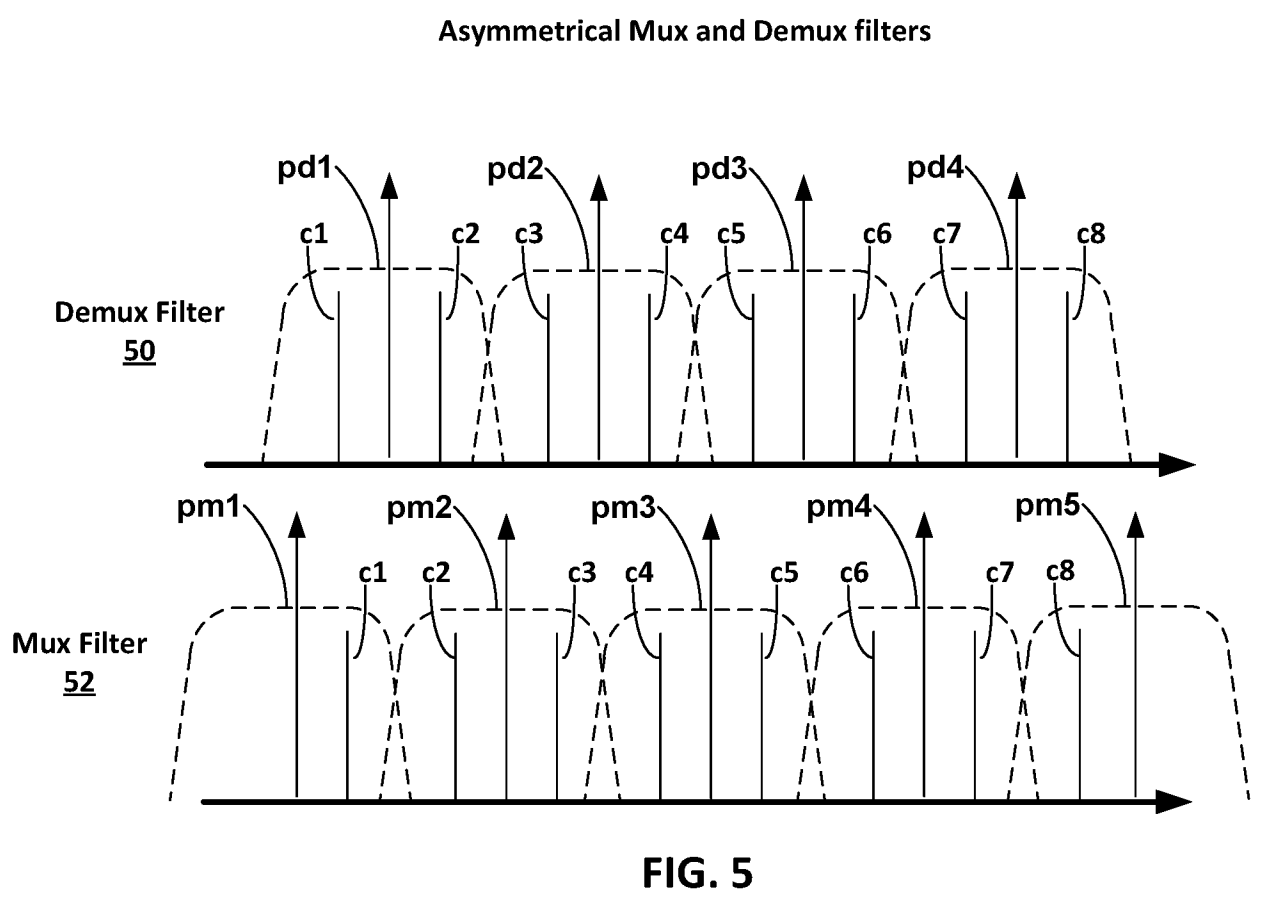

Asymmetrical Mux and Demux filters

Demux Filter 50

Mux Filter 52 pd1  pd2  pd3  pd4 pm1  pm2  pm3  pm4  pm5 c1  c2  c3  c4  c5  c6  c7  c8 c1  c2  c3  c4  c5  c6  c7  c8

FIG. 5

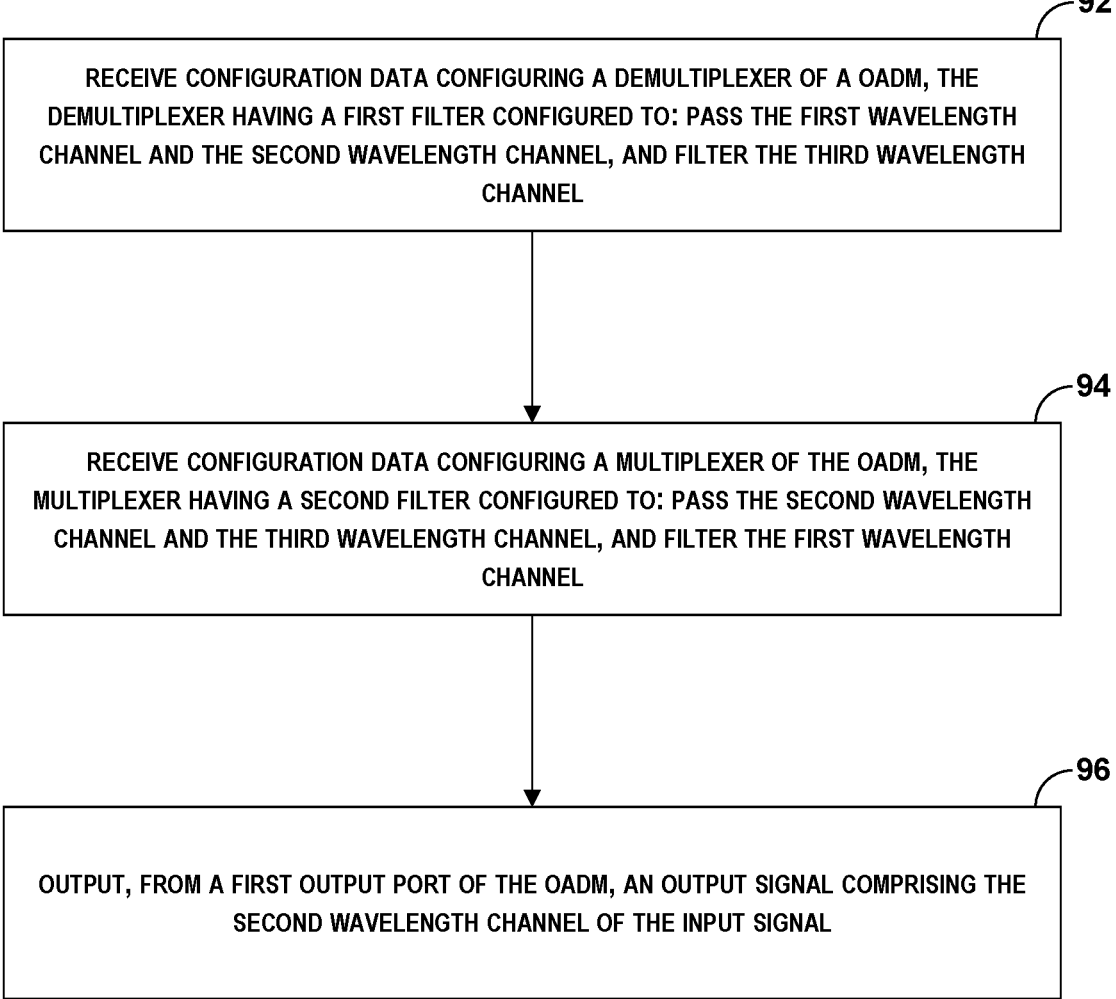

RECEIVE CONFIGURATION DATA CONFIGURING A DEMULTIPLEXER OF A OADM, THE DEMULTIPLEXER HAVING A FIRST FILTER CONFIGURED TO: PASS THE FIRST WAVELENGTH CHANNEL AND THE SECOND WAVELENGTH CHANNEL, AND FILTER THE THIRD WAVELENGTH CHANNEL

RECEIVE CONFIGURATION DATA CONFIGURING A MULTIPLEXER OF THE OADM, THE MULTIPLEXER HAVING A SECOND FILTER CONFIGURED TO: PASS THE SECOND WAVELENGTH CHANNEL AND THE THIRD WAVELENGTH CHANNEL, AND FILTER THE FIRST WAVELENGTH CHANNEL

OUTPUT, FROM A FIRST OUTPUT PORT OF THE OADM, AN OUTPUT SIGNAL COMPRISING THE SECOND WAVELENGTH CHANNEL OF THE INPUT SIGNAL

FIG. 9

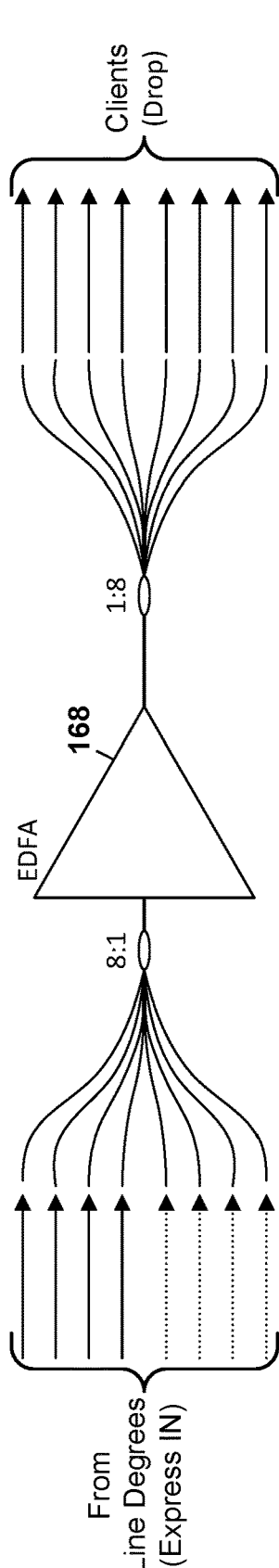
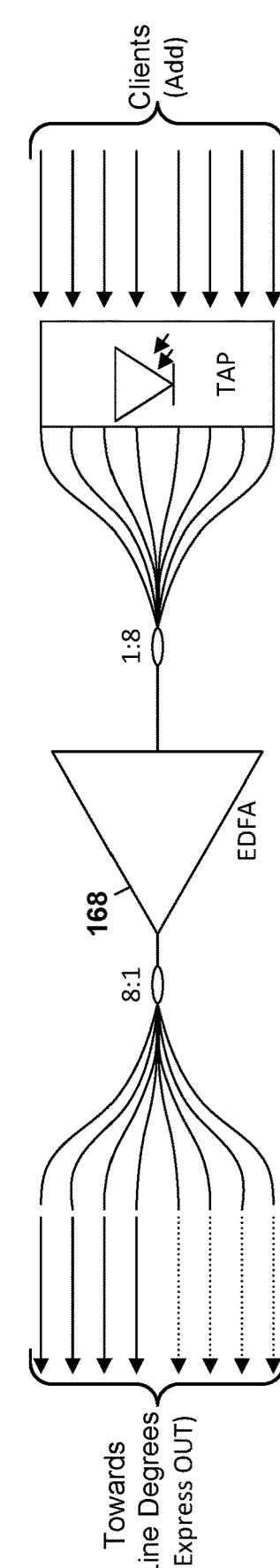
Drop-and-Waste
FIG. 11C

OPTICAL ADD DROP MULTIPLEXERS WITH ASYMMETRICAL FILTERING

TECHNICAL FIELD

This disclosure generally relates to optical networks and, more specifically, to optical add drop multiplexers.

BACKGROUND

Optical interconnection services within a data center or within data center clusters provide high-speed, low-latency connectivity between compute resources. Optical Add-Drop Multiplexers (OADMs) can be used to increase network flexibility for optical interconnection services. OADMs can add or remove wavelength channels from an existing wavelength-division multiplexing (WDM) signal. OADMs can also route removed channels to a different network path. This allows intermediate locations between remote sites to access the fiber segment linking them. OADMs are particularly important in metropolitan WDM light wave services. In these services, sites can be connected by different add-drop channels. OADMs can also enable wavelength reuse. For example, a wavelength can be dropped from one direction and then added to be transported in the opposite direction.

An OADM commonly includes three stages: an optical demultiplexer, an optical multiplexer, and a stage for directing wavelengths between the optical demultiplexer, the optical multiplexer, and a set of ports for adding and dropping signals. The demultiplexer separates wavelengths in an input fiber onto ports. Reconfiguring an OADM can be achieved by a fiber patch panel or by optical switches which direct the wavelengths to the multiplexer or to drop ports. The optical multiplexer multiplexes, onto a single output fiber, the wavelength channels that are to continue on from demultiplexer ports with those from the add ports.

SUMMARY

This disclosure describes techniques for Optical Add Drop Multiplexers (OADMs) that apply asymmetrical filtering to allow for individual channels within a channel group to be independently added/dropped or passed through. An OADM may implement a Combine-and-Route configuration to combine different sets of two or more wavelength channels of a WDM signal into channel groups. This configuration effectively doubles the number of degrees of the OADM, and it can be implemented by combining a colored filter and a colorless filter. The colored filter may include a Wavelength Selective Switch or arrayed waveguide grating, while the colorless filter may include a coupler or splitter. Within an OADM, demultiplexers separate the wavelengths of the WDM signal, and multiplexers combine multiple wavelengths into a new WDM signal for output on a fiber. Conventionally, in a Route-and-Select configuration or the Combine-and-Route configuration, the filtering profile of the multiplexer is symmetrical with that of the demultiplexer. Consequently, channels within a group add/drop or pass through together, and channels within a group must be output to the same direction/degree.

In accordance with techniques described herein, an OADM includes a multiplexer and demultiplexer in which the filtering profiles and thus the central frequencies are asymmetrical. For example, an OADM may include a demultiplexer configured with a filter that passes Channels 1 and 2 as Group A. The OADM may be configured to add/drop Channel 2 or express or route Channel 2 to a different degree. The OADM includes a multiplexer with a filter that is configured asymmetrically from that of the demultiplexer. For example, the filter may be offset by one channel wavelength to, for instance, pass Channels 2 and 3 as Group B. This multiplexer filters out Channel 1 and allows OADM to independently add/drop or express, or independently route Channel 2 from Channel 1, even though the demultiplexer filter passes Channels 1 and 2 as a group.

The techniques of the disclosure include one or more specific technical improvements that provide at least one practical application in the technical field of optical networks. As described herein, an OADM with asymmetrical filters facilitates independent add/drop or express, or independent routing of wavelength channels of WDM signals. When applied in a Combine-and-Route configuration, the techniques not only effectively double the number of ports, they reduce and in some cases eliminate any requirement that grouped channels be treated within the OADM as a group. Channels within the same group need not be added, dropped, or passed through together, nor must they go in the same direction. This improves routing flexibility and may expand the degrees of an OADM node. The techniques may also reduce cross talk between adjacent channels and the need for a guard band, where cross talk can produce multipath interference if two channels are connected by mistake. In some examples, with multiple cascading hybrid OADMs challenges such as compensation of chromatic dispersion and reduction of filter bandwidth are introduced. An OADM applying techniques described herein may reduce chromatic dispersion and avoid the reduction of filter bandwidth, allowing for more agile routing and effectively doubling the degrees of an OADM node without requiring doubling the amount of hardware.

In one example, an optical add-drop multiplexer comprises: a first input port configured to receive an input signal having a first wavelength channel, a second wavelength channel, and a third wavelength channel; a demultiplexer having a first filter configured to: pass the first wavelength channel and the second wavelength channel, and filter the third wavelength channel; a multiplexer having a second filter configured to: pass the second wavelength channel and the third wavelength channel, and filter the first wavelength channel; and a first output port configured to output an output signal comprising the second wavelength channel of the input signal.

In another example, an interconnection system comprises: an optical fiber supporting an interconnection; and an optical add-drop multiplexer comprising: a first input port configured to receive an input signal having a first wavelength channel, a second wavelength channel, and a third wavelength channel; a demultiplexer having a first filter configured to: pass the first wavelength channel and the second wavelength channel as a group, and filter the third wavelength channel; a multiplexer having a second filter configured to: pass the second wavelength channel and the third wavelength channel as a group, and filter the first wavelength channel; and a first output port configured to output, via the optical fiber, an output signal comprising the second wavelength channel of the input signal.

In another example, a controller comprises: processing circuitry coupled to a memory, the processing circuitry and memory configured to configure an optical add-drop multiplexer comprising: a first input port configured to receive an input signal having a first wavelength channel, a second wavelength channel, and a third wavelength channel; a demultiplexer having a first filter configured to: pass the first wavelength channel and the second wavelength channel as a group, and filter the third wavelength channel; a multiplexer having a second filter configured to: pass the second wavelength channel and the third wavelength channel as a group, and filter the first wavelength channel; and a first output port configured to output an output signal comprising the second wavelength channel of the input signal.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 5 is a conceptual diagram illustrating an example asymmetrical filtering profile of a multiplexer filter and demultiplexer filter within an OADM, in accordance with one or more techniques of the disclosure.

FIG. 9 is a flowchart of an example mode of operation of an OADM, in accordance with one or more techniques of the disclosure.

FIG. 11C is a conceptual diagram illustrating an example ROADM architecture.

Like reference characters refer to like elements throughout the figures and description.

DETAILED DESCRIPTION

Figure 1:
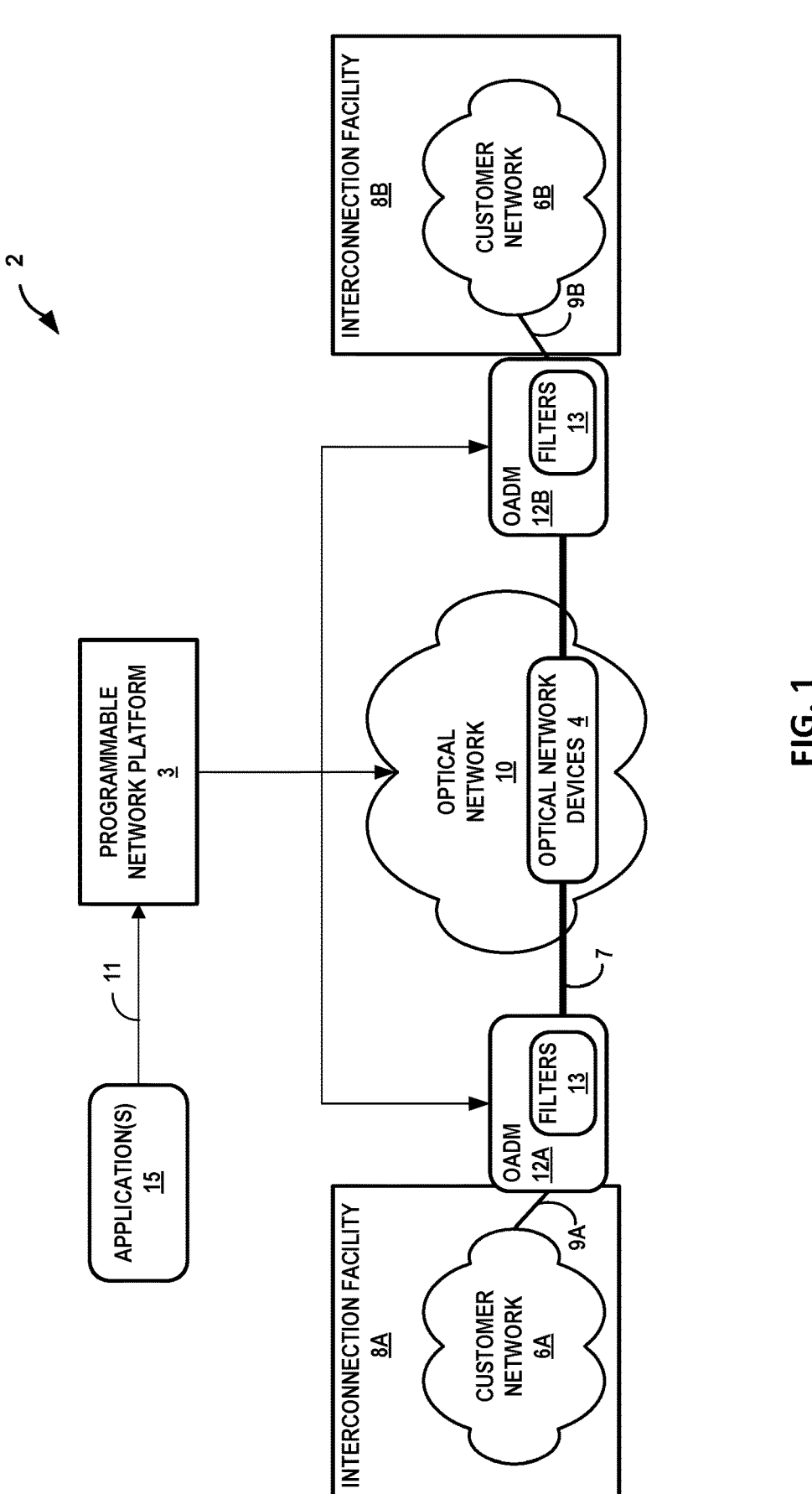
FIG. 1 is a block diagram illustrating an example interconnection system that incorporates an optical add-drop multiplexer with asymmetrical filters, in accordance with one or more techniques of the disclosure.

FIG. 1 is a block diagram illustrating an example interconnection system 2 that incorporates an optical add-drop multiplexer with asymmetrical filters, in accordance with one or more techniques of the disclosure. Interconnection system 2 depicts interconnection facilities 8A-8B (collectively, "interconnection facilities 8") operated by an interconnection system provider, the interconnection facilities 8 connected by an optical network 10 are configurable for cross-connecting customer networks 6A-6B (collectively, "customer networks 6"). In some instances, each of customer networks 6 may be associated with a different customer of the interconnection system provider. In some instances, customer networks 6 are both associated with a single customer of the interconnection system provider. As used herein, the term "customer" of the interconnection system provider may refer to a tenant of an interconnection facility 8 deployed by the interconnection system provider, whereby the customer leases space within the interconnection facility 8 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity.

Each of interconnection facilities 8 may represent different data centers geographically located within different metropolitan areas (e.g., New York City, Dallas, etc.) to provide a resilient and independent interconnection services exchange by which customers of one metropolitan area and customers of a different metropolitan area may connect to receive and provide, respectively, services.

In each of the interconnection facilities 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the same interconnection facility 8 and/or to other customer(s) co-located in another interconnection facility 8.

Optical network 10, including OADMs 12A-12B (collectively, "OADMs 12"), represents optical and photonic switching infrastructure that is configured by programmable network platform 3 to create a fiber cross-connect 7 that connects customer network 6A and customer network 6B co-located in interconnection facilities 8A and 8B, respectively. Optical network 10 may include pre-installed optical fiber between customer networks 6 and at least one distribution facility (or "distribution frame") of the interconnection facilities 8 and may further include pre-installed optical fiber between multiple distribution facilities of the interconnection facilities 8. Optical network 10 may further include programmable photonic switches located within distribution facilities of the interconnection facilities 8 and/or located at the demarcation of customer space located in interconnection facilities 8. While described herein dynamically configurable, much of optical network 10 may be statically configured by a network operator associated with the interconnection facility provider, a network service provider that manages aspects of optical network, or other entity.

Optical network 10 may include one or more optical network devices 4 such as photonic cross-connect (PXC), optical cross-connect (OXC), optoelectronic based switch (OEO), or other types of devices that switch optical signals. Each of optical network devices 4 may route optical signals (light beams or lambdas) between optical fibers coupled to the switch. Each of optical network devices 4 may include large port-count switches.

Although described with respect to two interconnection facilities 8A-8B, system 2 in various examples may include many additional interconnection facilities connected by optical network 10 in like manner as described with respect to interconnection facilities 8A-8B.

System 2 further includes a programmable network platform (PNP) 3, alternatively referred to herein as an "interconnection platform." Programmable network platform 3 may expose a software interface that defines the methods, fields, and/or other software primitives by which application(s) 15 may invoke PNP 3 to dynamically provision a fiber cross-connect 7 between customer networks 6A, 6B. In this way, PNP 3 provides customers, carriers, network service providers (NSPs), and/or the interconnection system provider itself with the programmatic capability of configuring optical switch fabric 10 to interconnect customer network 6A to customer network 6B with fiber cross-connect 7.

Programmable network platform 3 may represent an application executing within one or more data centers of system 2 or alternatively, off-site/remotely at a back office or branch of the interconnection system 2 provider, for instance. Programmable network platform 3 may be distributed in whole or in part among the data centers. As illustrated in FIG. 1, programmable network platform 3 may control service provisioning for multiple different interconnection facilities. Alternatively, or additionally, multiple separate instances of the programmable network platform 3 may control service provisioning for respective multiple different interconnection facilities.

Application(s) 15 represents at least one application that communicates with PNP 3 to request and dynamically provision an interconnection between interconnection facilities 8 of customer networks 6A, 6B. Application(s) 15 represent client-side software for interfacing with PNP 3 and may include a customer portal, web browser, customer applications, an interconnection system 2 provider application that is accessible only to operators of interconnection facilities 8, a console such as a command-line interface or graphical user interface. Users or clients of application(s) 15 may include enterprise customers, cloud service and content providers, carriers, network service providers (NSPs), and/or the interconnection system provider itself, for instance.

An application of application(s) 15 issues, to PNP 3, an interconnection request 11 that specifies parameters for interconnecting between interconnection facilities 8 of customer networks 6A and 6B. In response to receiving interconnection request 11, PNP 3 determines a path for the interconnection, e.g., an optical path through optical network 10, and dynamically provisions a path for the interconnection with fiber cross-connect 7 in optical network 10 to provide fiber-based interconnection between customer networks 6A, 6B to satisfy the interconnection request 11.

PNP 3 configures devices of optical network 10 by issuing configuration commands either directly to optical devices within optical network 10 by way of configuration interfaces of the elements, or indirectly to such elements via software-defined networking (SDN) controllers, e.g., an SDN controller, or other configuration elements that manage the optical devices on behalf of the PNP 3. For example, OADM 12A with asymmetrical filters 13 may present a configuration interface by which to receive configuration data from PNP 3 or another controller to configure add/drop for OADM ports, configure routing among degrees of OADM 12A, configure filters 13, and so forth. Various configuration protocols may be used. PNP 3 may in some instances be alternatively referred to as an orchestrator in that PNP 3 orchestrates one or more SDN controllers to configure OADMs 12, optical network devices 4 (e.g., photonic switches), and/or other elements of optical network 10 to establish fiber cross-connect 7.

Programmable network platform 3 configures optical network devices 4 to switch optical signals along optical paths, each optical path beginning at an optical transmitter and terminating at an optical receiver and each of the optical transmitter and optical receiver being associated with one of customer networks 6. In this way, customer networks 6 may exchange frames and packets for services via dynamically provisioned fiber cross-connects. An optical path may alternatively be referred to as, a light path, a lambda or an optical transport network wavelength, or a composite DWDM optical signal. Example bandwidths for an optical path for a cross-connect may include, e.g., 2.5 Gbps, 10 Gbps, 40 Gbps, 100 Gbps, 400 Gbps, or even multi-terabit DWDM optical signals. An optical fiber may include multiple optical paths, i.e., the optical fiber may transport optical signals for multiple optical paths as different lambdas, for instance. Optoelectronic-based switches may limit switching applications according to the data rate, protocol, and format supported by the electronic components of switches.

Fiber cross-connect 7 may represent a Layer 0 ("L0") connection in that the fiber cross-connect underlies the Open Systems Interconnection (OSI) model or TCP/IP model for packet networking. In particular, fiber cross-connect 7 may underlie an optical transport network (OTN) layer that (typically in conjunction with a SONET/SDH layer) provides Layer 1 ("L1") connectivity between optical network devices 4 such as wavelength division multiplexing (WDM) devices. For instance, fiber cross-connect 7 may represent one or more wavelengths (or "lambdas") photonically switched by elements of optical switch fabric to provide an optical path (or "light path") for optical signals exchanged between customer networks 6A, 6B associated with different customers/tenants of the interconnection system 2 provider. In this way, optical network 10 is configured to provide non-blocking switching by way of a high-speed fiber connection between respective customers networks 6A, 6B for the customers of the interconnection system 2 provider and, in doing so, may provide reliable and low-latency communication between customer networks 6A, 6B.

Customer networks 6A, 6B use respective access links 9A, 9B to access fiber cross-connect 7 to exchange data. Access links 9A, 9B may represent, in some instances, grey links/optics, in which a router or switch of customer networks 6A, 6B exchanges grey (uncolored) optical signals with a coherent optical device that converts between a grey optical signal and an optical signal at a specific wavelength (color) exchanged with an optical network device of optical network 10. In some examples, a pluggable coherent optical device may be directly integrated to an optical network device (e.g., panel of the optical network device), which eliminates the need for short-reach optical pluggable module.

Fiber cross-connect 7 may in some cases underlie a layer 2 ("L2") or layer 3 ("L3") service provided by the interconnection system 2 provider to interconnect customer networks 6A, 6B according to an L2 or L3 service. For example, interconnection facility 8 may operate a network services exchange, such as Ethernet Exchange, and Internet Exchange, and/or a Cloud Exchange, and each of these may make use of dynamically provisioned fiber cross-connect 7 to transmit L2/L3 packet data between customer networks 6A, 6B.

OADMs 12 may be used to increase network routing flexibility for optical interconnection services. OADMs 12 are described herein after with respect to OADM 12A. OADM 12A includes a demultiplexer to separate the wavelengths of one or more input signals and a multiplexer to combine multiple wavelengths for an output signal. In some examples, input signals of the OADM 12A may include the wavelengths of a WDM signal, the wavelengths used to implement fiber cross-connect 7. Examples of OADM 12A, include, but are not limited to Reconfigurable Optical Add Drop Multiplexer (ROADM) configurations such as Broadcast-and-Select, Route-and-select, and Combine-and-Route. One or more of these configurations may use filters 13 to implement, or in conjunction with, the multiplexer and demultiplexer of the OADM. Example components of an OADM that use filters 13 include, but are not limited to, Wavelength Selective Switches, arrayed waveguide gratings, couplers, and splitters. Accordingly, the term "OADM," as used herein may refer to any of the foregoing architectures or any other configuration suitable for implementation of techniques described herein.

In some examples, OADM 12A may be configured in a Combine-and-Route configuration to combine different sets of two or more wavelength channels of one or more WDM signals into channel groups. Conventionally, in the Combine-and-Route configuration, the filtering profile of the multiplexer is symmetrical with that of the demultiplexer. The filters of the multiplexer pass the wavelength channels in groups in like manner to the filters of the demultiplexer. With such symmetrical filtering profiles, wavelength channels within a group must add/drop or be routed through together to the same direction/degree. A single channel cannot be independently processed without other channels of its group, thereby limiting routing flexibility. Additionally, conventional use of the Combine-and-Route configuration may result in cross talk between adjacent channels and the need for a guard band. Further, when an optical channel passes through an OADM node, only one optical path connection is needed. Multi-path interference (MPI) may occur if two paths which have the same optical channels are connected by mistake. As well, in some examples with multiple cascading OADMs, challenges such as compensation of chromatic dispersion and bandwidth filter narrowing are introduced. Therefore, it may be desirable for OADMs to be configured with independent channel processing for flexible routing with reduced: cross talk, multi-path interference, chromatic dispersion and bandwidth narrowing.

In accordance with techniques described in this disclosure, OADM 12A includes a multiplexer and demultiplexer in which the filtering profiles of filters 13 and thus the central frequencies are asymmetrical. For example, OADM 12A includes a demultiplexer having a filter that passes wavelength channels 1 and 2 as Group A and filters wavelength channel 3. Channel 2 may be added/dropped, expressed, or routed to a different degree by the OADM. A multiplexer of OADM 12A, having a filter that is configured asymmetrically from that of the demultiplexer, applies the filter to the signal for channel 2. The filter of the multiplexer may be offset by one channel wavelength to, for instance, pass channels 2 and 3 as Group B. This multiplexer filters out channel 1, which allows OADM 12A to be configured to independently add/drop, express, or route channel 2 from channels 1 and 3. Furthermore, the use of asymmetrical filters may reduce the impairment of bandwidth narrowing thus allowing more OADMs to be deployed, reduce the need for a guard band, reduce chromatic dispersion (CD) ripple, ensure tolerance to frequency error and remove multi-path interference. Additionally, the techniques of this disclosure may effectively double the degrees of an OADM node without doubling the amount of hardware.

Figures 2, 3:
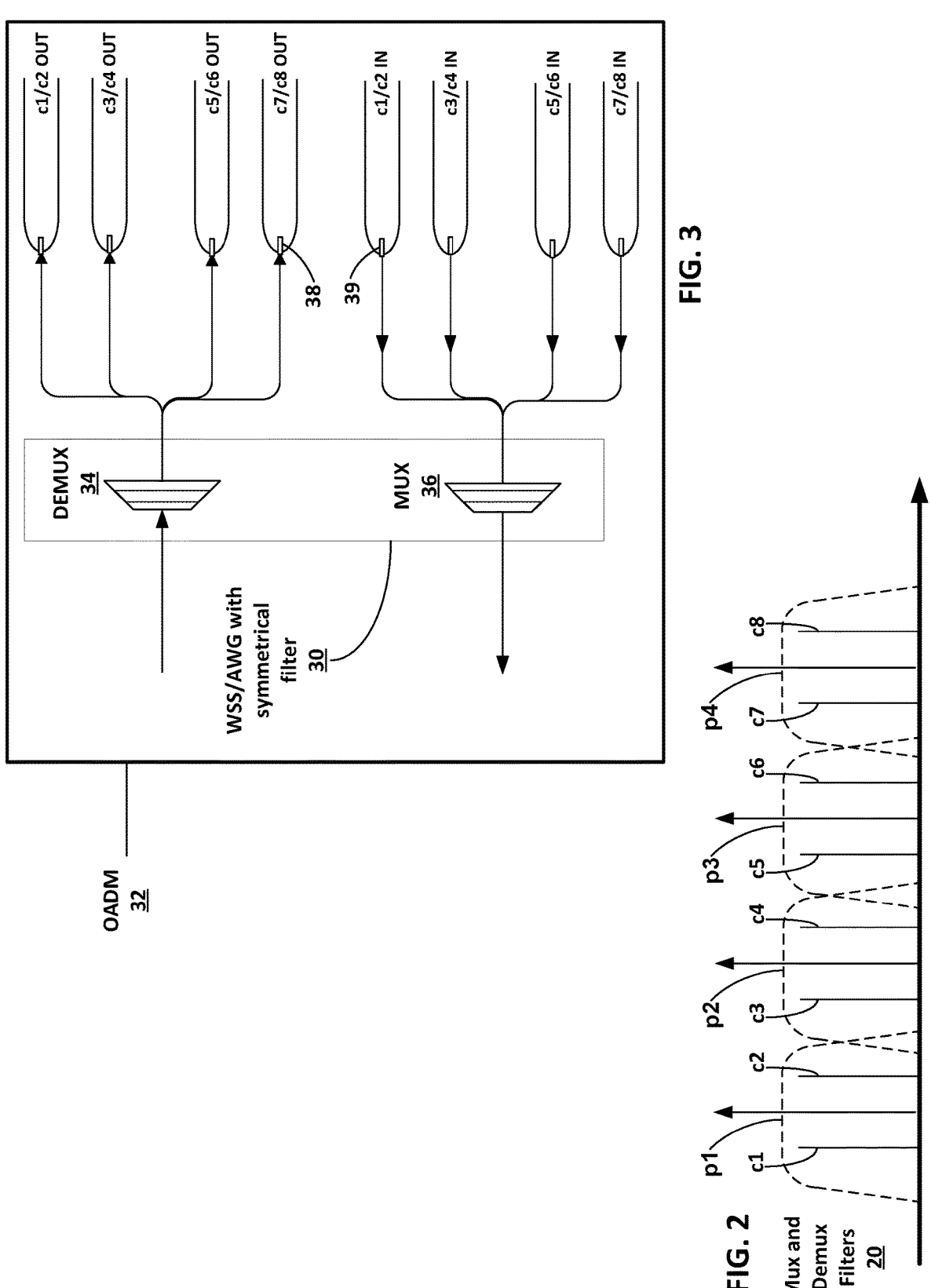
FIG. 2 is a conceptual diagram illustrating an example symmetrical filtering profile of one or more multiplexers and demultiplexers within an OADM.
FIG. 3 is a conceptual diagram illustrating, an OADM in a Combine-and-Route configuration with a multiplexer and demultiplexer having the symmetrical filtering profiles shown in FIG. 2.

FIG. 2 is a conceptual diagram illustrating an example symmetrical filtering profile 20 of one or more multiplexers and demultiplexers within an OADM. In this example, the center frequencies and pass bands of the multiplexer and demultiplexer filters are symmetrical and include four filters configured with respective passbands that each pass two channels as a group. For instance, the input signal into the multiplexer or demultiplexer may contain 8 channels c1-c8; the first passband p1 may pass channels c1 and c2 and filter channels c3-c8. The number of channels is not limited to 8 and could be increased or decreased depending on how wide of a spectrum is allowed. In some examples, the filtering center and bandwidth of the filters may be dynamically configured for additional network flexibility.

FIG. 3 is a conceptual diagram illustrating, an OADM 32 in a Combine-and-Route configuration with a multiplexer 36 and demultiplexer 34 having the symmetrical filtering profiles shown in FIG. 2. Demultiplexer 34 and multiplexer 36 may be associated with a particular degree of OADM 32.

The Combine-and-Route configuration may be implemented by combining a colored filter implemented as a multiplexer/demultiplexer and a colorless filter. In some examples, the colored filter may comprise a Wavelength Selective Switch (WSS) and/or an arrayed waveguide grating (AWG) 30, and the colorless filter may comprise a splitter 38 and/or a coupler 39. Each of demultiplexer 34 and multiplexer 36 may be implemented with a different WSS. Demultiplexer 34 may be a colored filter with the four passbands p1-p4 illustrated in FIG. 2, where upon receiving an input signal with 8 wavelength channels, the demultiplexer 34 may pass four groups of channels c1/c2, c3/c4, c5/c6 and c7/c8 to respective splitters 38. Splitters 38 may then split the groups of channels into two identical channels (e.g., c1/c2 are split into c1/c2 and c1/c2-illustrated by an upper arm and lower arm formed to the right of each of the splitters 38). The splitters 38 double the number of ports (e.g., from 4 to 8) for the OADM. Couplers 39 associated with multiplexer 36 combine sets of two channels (i.e., combining the upper arm and lower arm) to be passed or filtered by one or more multiplexers 36 of OADM 32. However, multiple path interference may occur if the coupler 39 combines two of these channels which contain the same wavelengths. This limitation along with other limitations (discussed in further detail with reference to FIG. 4) results in the number of ports for Combine-and-Route configuration with symmetrical filters not being truly doubled.

Figure 4:
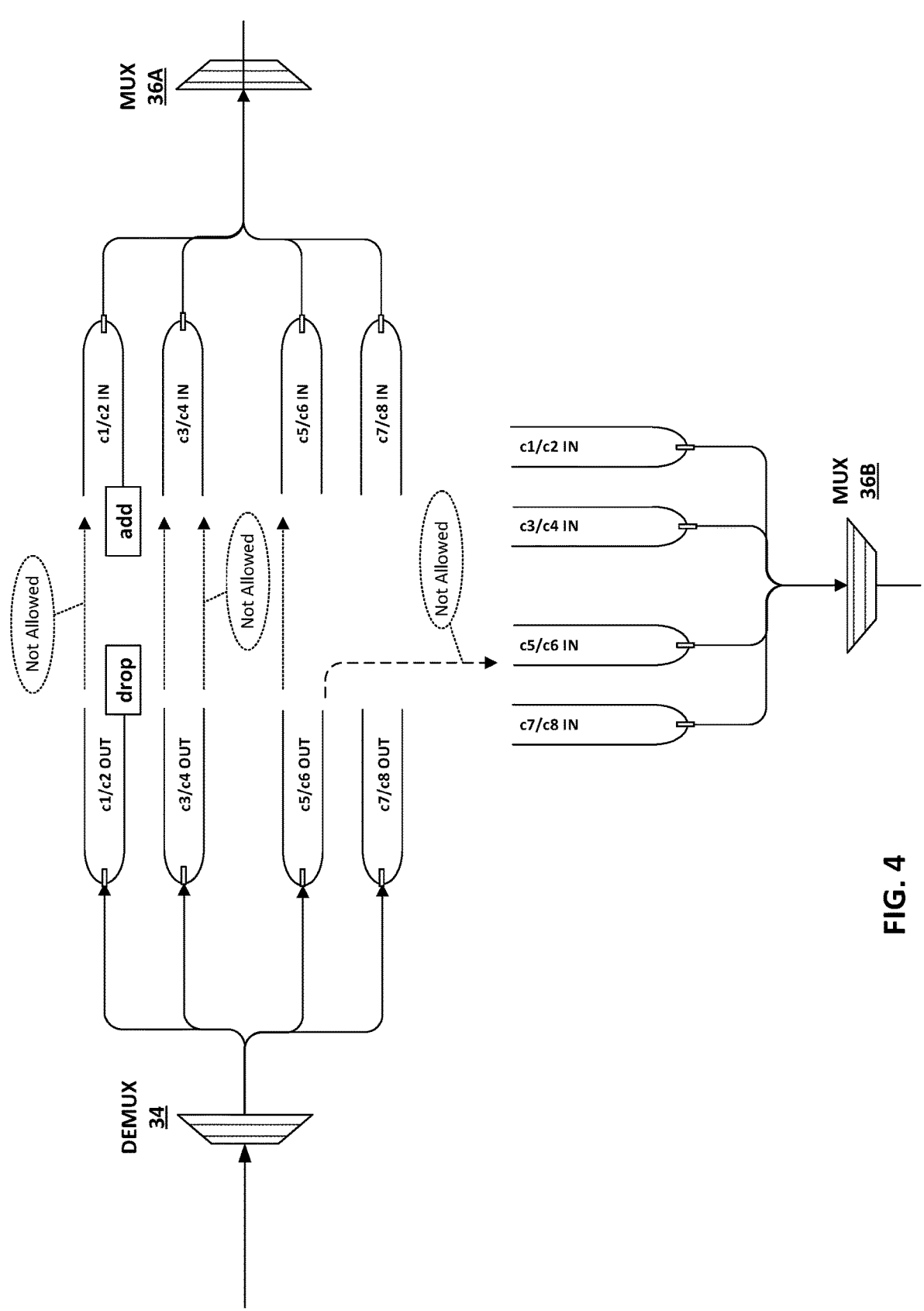
FIG. 4 is a conceptual diagram illustrating, in further detail, an OADM in a Combine-and-Route configuration with two multiplexers and a demultiplexer all having symmetrical filtering profiles.

FIG. 4 is a conceptual diagram illustrating, in further detail, an OADM in a Combine-and-Route configuration with two multiplexers 36A and 36B and a demultiplexer 34 all having symmetrical filtering profiles.

In the example of FIG. 4, multiplexer 36B is associated with a second degree for the OADM (i.e., a second direction for any of the channels to be routed) in addition to the first degree associated with multiplexer 36A. In this example, the limitations of the Combine-and-Route configuration with symmetrical filters are shown. For example, the channels within a group must add/drop or pass through together, the channels within a group must go to the same direction, and multiple path interference will occur if two paths comprising channels within the same group are connected.

For example, it may be desired to route channel c5 of group c5/c6 OUT to a first degree (e.g., multiplexer 36A) and route channel c6 of group of c5/c6 OUT to a second degree (e.g., multiplexer 36B), but this is not allowed with symmetrical filters for demultiplexer 34/multiplexers 36 due to the limitation that channels within a group must go to the same direction (i.e., same degree). As another example, it may be desired to route channel c1 of group c1/c2 OUT to multiplexer 36A and "drop" channel c2 of group c1/c2 OUT and then "add" channel c2, from an input line in to the OADM, back to be routed to multiplexer 36A. This is not allowed due to the limitation that the channels within a group must add/drop or pass through together. As another example, it may occur that paths for channels c3 and c4 of group c3/c4 OUT have been erroneously connected. For example, the splitter creates two paths containing the same signal, the upper arm path containing channels c3 and c4, and the lower arm path containing channels c3 and c4. If both the upper arm and lower arm are connected to the multiplexer 36A then multiple path interference may take place because of the upper arm and lower arm each having the same optical signal but with different phase. Further, in this situation, dependent on the phase, a constructive or destructive interference may occur and due to the phase not being stable, fluctuation may also occur. As a result, certain proactive procedures need to be in place to prevent this issue from happening. For example, a photo diode can be placed inside the input port and when the erroneous connections happen, an alarm can be sent to the end user. In another example, a variable optical attenuator (VOA) may be placed in the optical path, the VOA can be set to high attenuation to block the erroneous connections. Due to at least these limitations, the number of ports is not truly doubled (e.g., the lack of ability to individually route a channel to different degrees may only allow practical use of 4 of the ports instead of all 8). The techniques of this disclosure may overcome these limitations.

In some examples, the only routing that may be allowed for this configuration is when only one channel of a group of channels is add/dropped or routed. For example, where channel c3 of group c3/c4 OUT is routed to multiplexer 36A, channel c4 of group c3/c4 OUT must be routed to multiplexer 36A using the same connection. Channel c4 of group c3/c4 OUT cannot be add/dropped or routed anywhere.

FIG. 5 is a conceptual diagram illustrating an example asymmetrical filtering profile of a multiplexer filter 52 and demultiplexer filter 50 within an OADM, in accordance with one or more techniques of the disclosure. Multiplexer filter 52 may represent any of filters 13 of FIG. 1 or a filter for multiplexer 66 described herein. Demultiplexer filter 50 may represent any of filters 13 of FIG. 1 or a filter for demultiplexer 64 described herein. FIG. 5 illustrates that the center frequencies and pass bands pm1-pm5 of the multiplexer filter 52 and demultiplexer filter 50 are asymmetrical. The term "asymmetrical" in this disclosure refers to a configuration, according to techniques of this disclosure, of respective filters of a multiplexer and demultiplexer that are not mirror images of one another and do not possess symmetry. Rather, the asymmetrical filtering profiles of the multiplexer and demultiplexer are offset from one another by at least one channel spacing (i.e., the range of wavelengths between channels).

For example, the center frequencies between the multiplexer filter 52 and demultiplexer filter 50 are offset by one channel spacing, and the pass bands pm1-pm5 of the multiplexer 52 therefore group different channels than the pass bands pd1-pd4 of the demultiplexer filter 50. In the illustrated example, the demultiplexer filter 50 comprises four filters with respective passbands pd1-pd4 configured to pass two channels per passband as a group, and the multiplexer filter 52 comprises 5 filters with respective passbands pm1-pm5 configured to pass one or two channels per passband as a group. Here, the input signal into the multiplexer filter 52 or demultiplexer filter 50 may contain 8 channels c1-c8. The first pass band pd1 of the demultiplexer may pass channels c1 and c2 and filter channels c3-c8; however, the first pass band pm1 of the multiplexer filter 52 may pass just channel c1 and filter channels c2-c8. By combining asymmetrical filters 50 and 52 inside of an OADM it allows for an individual channel to be processed. The number of channels is not limited to 8 and could be increased or decreased depending on how wide of a spectrum is allowed and the number of channels supported by the OADM. In some examples, the filtering center and bandwidth of the filters may be dynamically configured for additional network flexibility. Further, the number of channels grouped by the pass band and the channel spacing offset between the multiplexer filter 52 and demultiplexer filter 50 may be increased or decreased.

Figure 6:
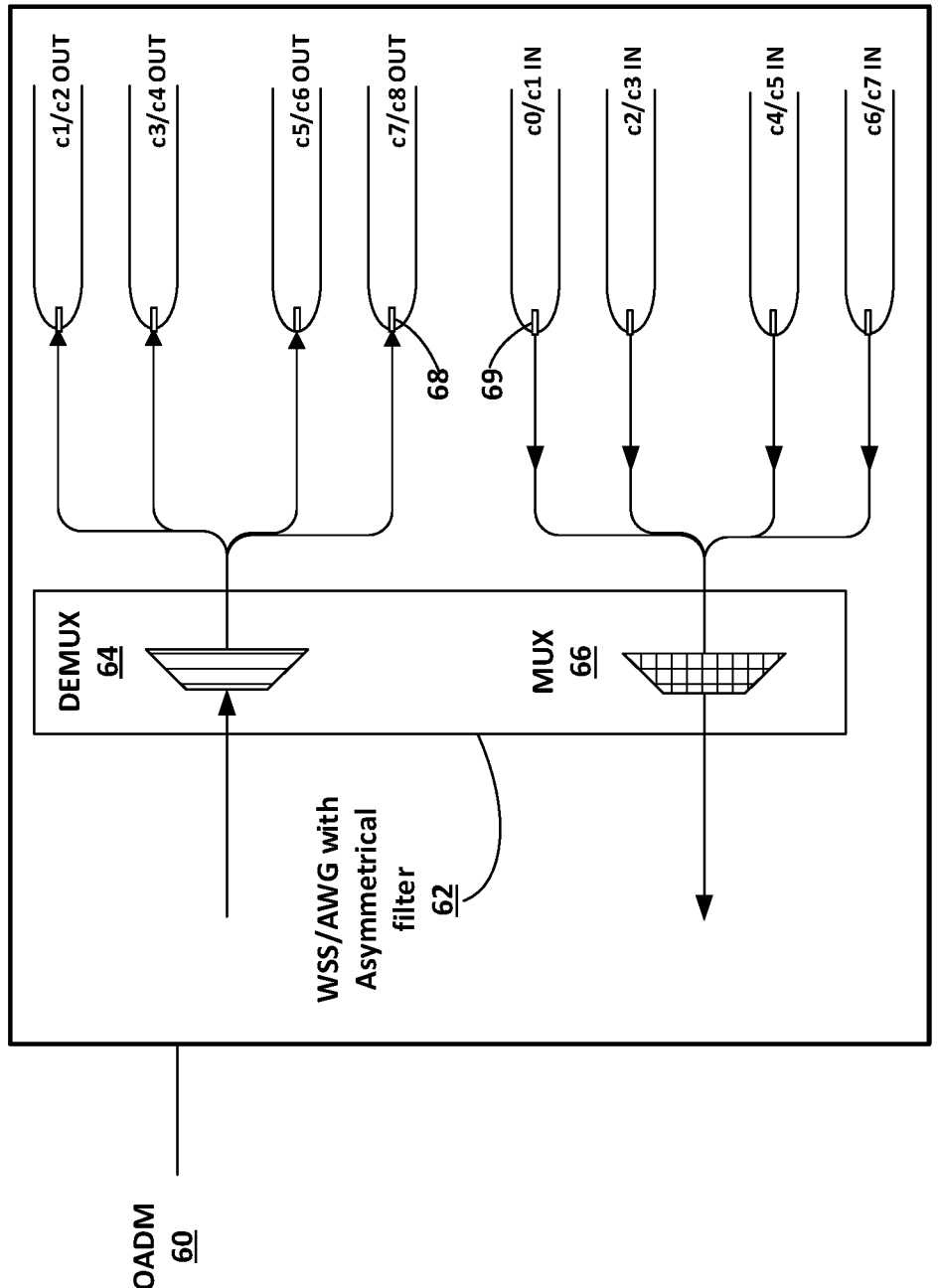
FIG. 6 is a conceptual diagram illustrating, an OADM in a Combine-and-Route configuration with a multiplexer and demultiplexer having the asymmetrical filtering profiles shown in FIG. 5, in accordance with one or more techniques of the disclosure.

FIG. 6 is a conceptual diagram illustrating, an OADM 60 in a Combine-and-Route configuration with a multiplexer 66 and demultiplexer 64 having the asymmetrical filtering profiles shown in FIG. 5, in accordance with one or more techniques of the disclosure. OADM 60 may represent a planar Lightwave circuit (PLC) ROADM, a Wavelength Selective Switch (WSS), or a Wavelength Crossconnect, for instance. The configuration may be implemented by combining a colored filter implemented as a multiplexer/demultiplexer and a colorless filter. In some examples the colored filter may comprise a WSS and/or an AWG 62 and the colorless filter may comprise a splitter 68 and/or a coupler 69. For instance, the demultiplexer 64 may be a colored filter with the four passbands illustrated in FIG. 5, where upon receiving an input signal with 8 wavelength channels, may pass four groups of channels c1/c2, c3/c4, c5/c6 and c7/c8 to their respective splitters 68. In some examples, the splitters 68 may then split the groups of channels into two identical channels (e.g., c1/c2 may get split into c1/c2 upper arm and c1/c2 lower arm). The splitters 68 may double the number of ports (e.g., from 4 to 8). Further, in some examples, the couplers 69 may combine two channels to be passed or filtered by the multiplexer 66. However, unlike the example shown in FIG. 3, multiple path interference will not occur due to the properties of the asymmetrical filters, and the OADM can individually and independently process channels within any of the groups, as discussed in further detail with reference to FIG. 7 and FIG. 8.

In some examples, the colored filters may be cascaded and configured to filter out specific frequency bands. These colored filters may still comprise asymmetrical filtering profiles to facilitate independent channel routing. For example, a colored filter may be added after the demultiplexer 64 but before each splitter 68, and a colored filter may be added after each coupler 69 but before the multiplexer 66. These filters may be configured to filter a wavelength range into specific wavelength bands. Adding a colored filter would further double the number of ports (e.g., from 8 to 16). In some examples, cascaded colored filters with asymmetrical filtering profiles may be added after the demultiplexer 64 but before each splitter 68, and cascaded colored filters may be added after each coupler 69 but before the multiplexer 66. The addition of each colored filter in a cascaded configuration may further double the number of ports.

In some examples of OADM 60, an optical switch may be placed before splitter 68. This allows for an option to configure OADM 60 in a traditional OADM configuration or configure OADM 60 in the Combine-and-Route configuration illustrated in FIG. 6.

Figure 7:
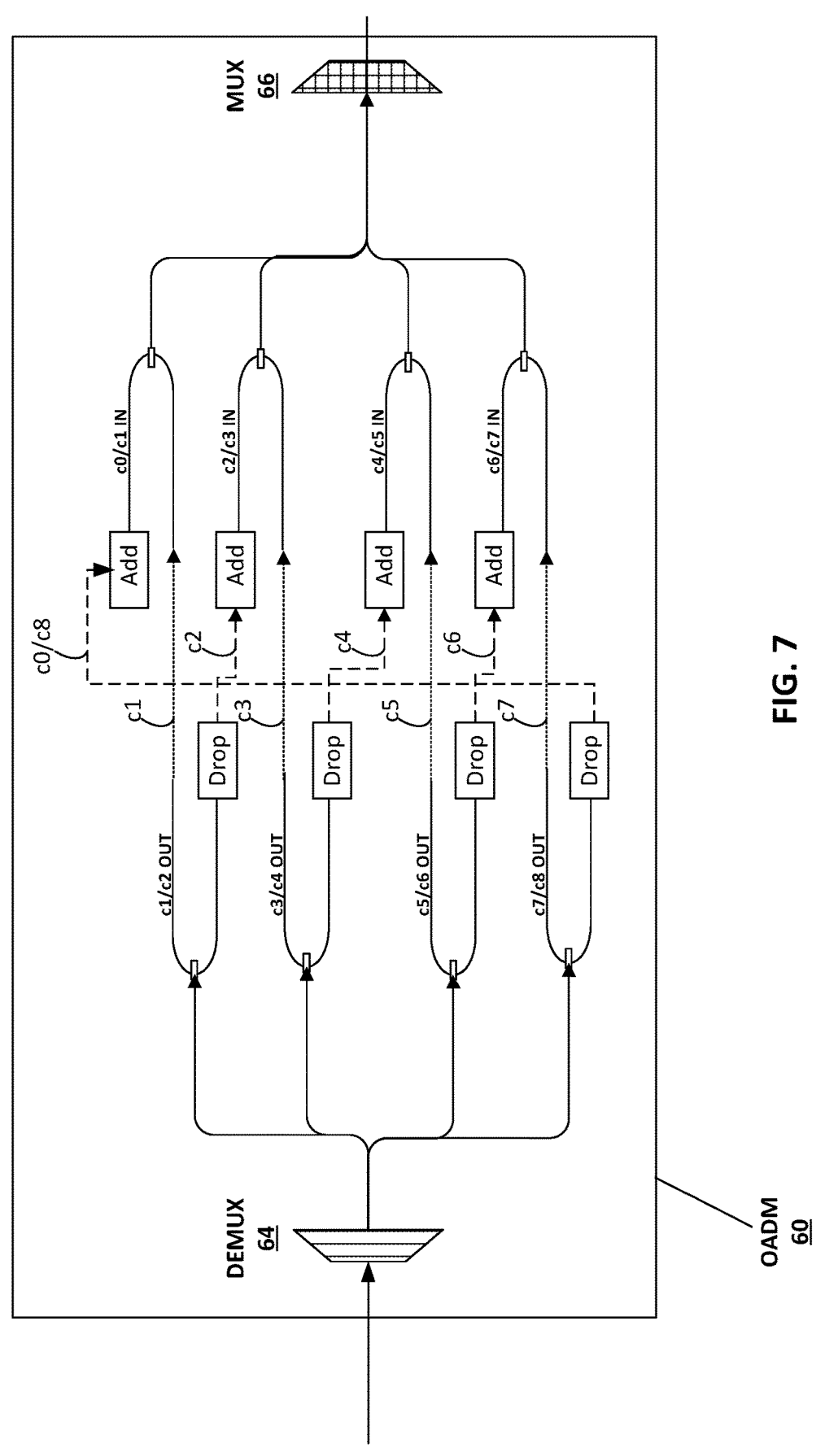
FIG. 7 is a conceptual diagram illustrating, in further detail, an OADM in a Combine-and-Route configuration with a multiplexer and a demultiplexer having asymmetrical filtering profiles, in accordance with one or more techniques of the disclosure.

FIG. 7 is a conceptual diagram illustrating, in further detail, an OADM 60 in a Combine-and-Route configuration with a multiplexer 66 and a demultiplexer 64 having asymmetrical filtering profiles, in accordance with one or more techniques of the disclosure. OADM 60 in a Combine-and-Route configuration of this disclosure may contain drop output ports which refer to the output of dropped signals from the OADM and output ports which refer to the output of signals after a multiplexer of the OADM.

The asymmetrical filtering profiles for demultiplexer 64 and multiplexer 66 address limitations of the Combine-and-Route configuration with symmetrical filters, shown with reference to FIG. 4. Demultiplexer 64 filters the input channels into groups to be duplicated by the splitter and routed to an upper arm and lower arm. Depending on a configuration of OADM 60, the channels output by the splitter may be individually added, dropped, or routed to the multiplexer 66. In one example, all the odd channels (c1, c3, c5, and c7) are individually routed directly to multiplexer 66 and all the even channels (c2, c4, c6, and c8) are dropped/ added before being routed to multiplexer 66. For instance, channel c2 of group c1/c2 OUT is dropped and then a new channel c2 signal from an input port is added to be combined with channel c3 of group c2/c3 IN. After being combined by the coupler, the multiplexer 66 will pass channels c2 and c3 for this group but filter channels c1 and c4, thus allowing individual channels within the group of c1/c2 OUT to be added, dropped, or routed to multiplexer 66. In some examples, when certain requirements of the free spectral range are satisfied, the periodic feature of optical diffraction can be used so that channel c8 of group c7/c8 OUT can be dropped and then a channel c0 added to be combined with channel c1 of group c1/c2 OUT to form c0/c1 IN. Multiplexer 66 passes added channel c0/c8 and channel c1 but filters channels c2 and c7. For example, channel n (n=8 in the example of FIG. 7 but is not limited to n=8) can be connected to a port 0 input of OADM 60 if the free spectral range (FSR) is equal to n*(Channel Spacing), where $m\lambda_0 = d$ $(\sin \alpha + \sin \beta) = (m-1)\lambda_8$ and $\lambda_i$ is the $i^{th}$ channel. Here, m is the diffraction order, d is the grating period, $\alpha$ is the input angle and $\beta$ is the output angle. As seen, the output angles of $\lambda_0$ and $\lambda_8$ are the same when their input angles are aligned. The difference between $\lambda_0$ and $\lambda_8$ is defined as FSR. Again, this uses the periodic feature of optical diffraction. The colored filter utilizes optical diffraction to demultiplex or multiplex signal with different frequencies. By using this property, one can route the signal at $\lambda_8$ to the port 0 without penalty.

Figure 8:
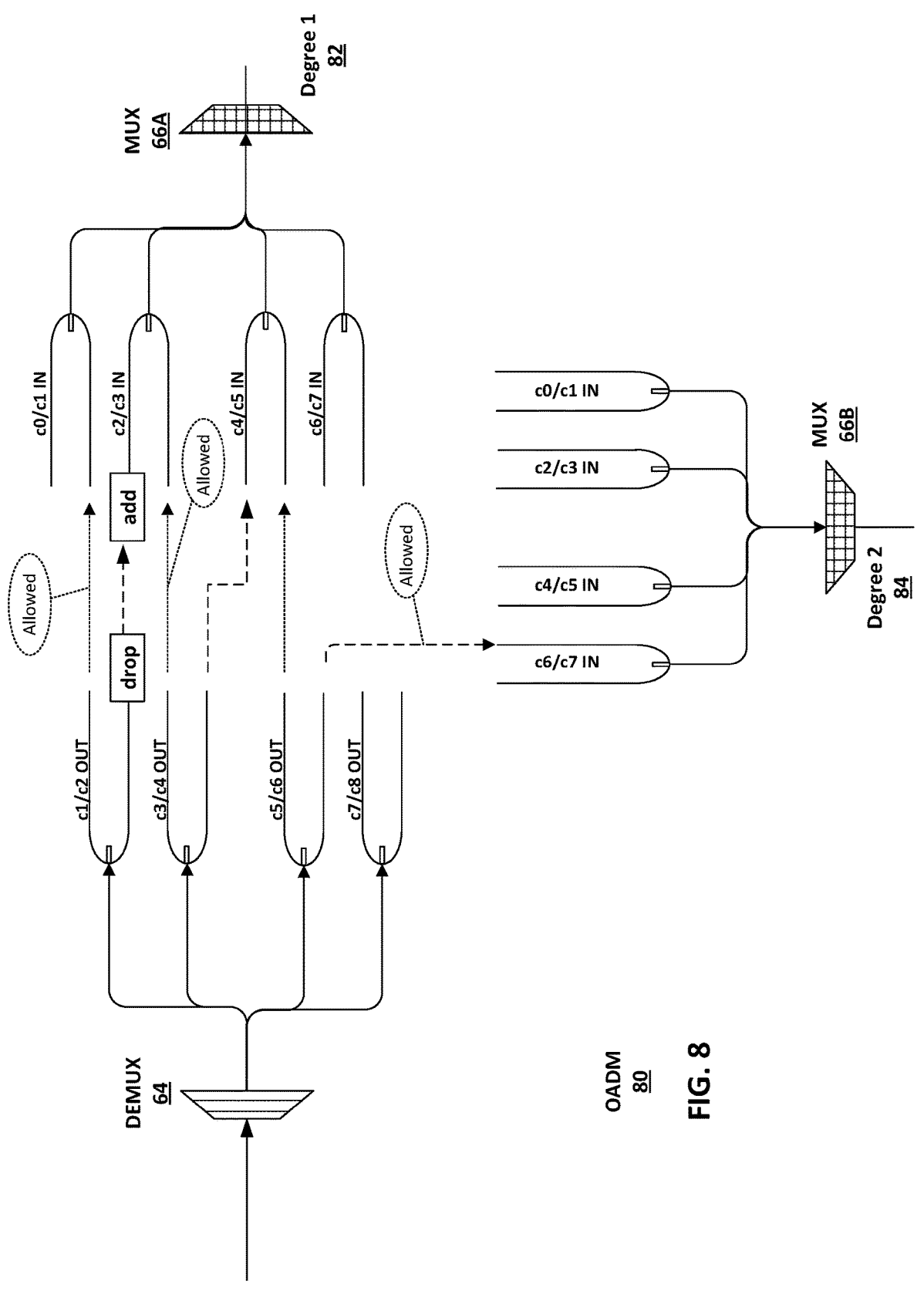
FIG. 8 is a conceptual diagram illustrating another implementation of an OADM 80 in a Combine-and-Route configuration with multiplexers having a same filtering profile that is asymmetrical to a filtering profile of a demultiplexer, accordance with one or more techniques of the disclosure.

FIG. 8 is a conceptual diagram illustrating another implementation of an OADM 80 in a Combine-and-Route configuration with multiplexers 66A and 66B having a same filtering profile that is asymmetrical to a filtering profile of demultiplexer 64, in accordance with one or more techniques of the disclosure.

The example of FIG. 8 may resemble the example of FIG. 4 in that OADM 80 has a second degree, in this case associated with multiplexer 66B, where the first degree is associated with multiplexer 66A. However, the asymmetrical filters implemented in the example with reference to FIG. 8 address limitations of the symmetrical filter configuration described with reference to FIG. 4. For instance, FIG. 8 shows that the channels within a group may add/drop or be routed independently, the channels within a group may be routed to different degrees, and the configuration may reduce and, in some cases, eliminate multiple path interference.

For example, OADM 80 can be configured to route channel c5 of group c5/c6 OUT to a first degree 82 (e.g., multiplexer 66A) and to route channel c6 of group of c5/c6 OUT to a second degree 84 (e.g., multiplexer 66B). With asymmetrical profiles for demultiplexer 64 and multiplexers 66A-66B, channels within the same group can be routed to different degrees (i.e., directions). In this example, OADM 80 routes channel c5 of group c5/c6 OUT to first degree 82, where multiplexer 66A passes channel c5 but filters channel c6 (for the c4/c5 group at multiplexer 66A). Further, OADM 80 routes channel c6 of group c5/c6 OUT to second degree 84, where multiplexer 66B passes channel c6 but filters channel c5 (for the c6/c7 group at multiplexer 66B). In some examples, the signal of channel c6 may be output by the output port of the second degree.

OADM 80 may be configured to route channel c1 of group c1/c2 OUT to multiplexer 66A and drop channel c2 of group c1/c2 OUT and then add a new input signal of channel c2 to multiplexer 66A as part of group c2/c3 IN. With asymmetrical profiles for demultiplexer 64 and multiplexers 66A-66B, channels within the same group can be individually added/dropped or routed. As shown in FIG. 8, OADM 80 routes channel c1 of group c1/c2 OUT to multiplexer 66A. Multiplexer 66A passes channel c1 but filters channel c2 as part of group c0/c1 IN. Further, channel c2 of group c1/c2 OUT, after having a new input signal added, is routed to multiplexer 66A. Multiplexer 66A passes channel c2 but filters channel c1 as part of group c2/c3 IN. In some examples, channel c2 of group c1/c2 OUT may be added from a second input signal that is passed through a second demultiplexer and routed to multiplexer 66A.

OADM 80 may be configured to route c3 and c4, both of group c3/c4 OUT, to multiplexer 66A. With asymmetrical profiles for demultiplexer 64 and multiplexers 66A-66B, two channels within the same group from a demultiplexer can be routed in the same direction without the need for any proactive procedures to prevent multiple path interference because the channels that would interfere will be filtered out. In this example, OADM 80 routes channel c3 of group c3/c4 OUT to multiplexer 66A. Multiplexer 66A passes channel c3 but filters channel c4 as part of group c2/c3 IN. Channel c4 of group c3/c4 OUT is also routed to multiplexer 66A. Multiplexer 66A passes channel c4 but filters channel c3 as part of group c4/c5 IN.

With the channels of the group individually processed, this reduces interference further downstream, allowing each of the 8 ports to be practically used. In this way, the OADM Combine-and-Route configuration with asymmetrical filters may provide an actual doubling of the number of ports.

The asymmetrical filtering techniques of this disclosure can be applied in other contexts. For example, the techniques may be applied to super channels and carrier groups. Super channels are a group of individual channels combined with minimal guard band that may be treated as one channel. Carrier groups are a group of individual channels with equal channel spacing. For example, 64 channels of 400GE-ZR (with 75 GHz channel spacing) can fit into C band. The 64 channels can be divided into 8 carrier groups. Each carrier group contains 8 channels. The channel spacing is 600 GHz and the carrier group can be routed as one channel.

FIG. 9 is a flowchart of an example mode of operation of an OADM, in accordance with one or more techniques of the disclosure. FIG. 9 is described with respect to asymmetrical multiplexer and demultiplexer filters 52 and 50, respectively, within OADM 60. However, the example technique of FIG. 9 may be used with other asymmetrical filter configurations.

OADM 60 receives configuration data to configure a demultiplexer 50 so that the demultiplexer comprises a filter configured to pass a first channel and a second channel but filter a third channel, as a group (92). OADM 60 also receives configuration data to configure multiplexer 52 of OADM 60 so that the multiplexer 52 comprises a filter configured to pass the second channel and the third channel but filter the first channel, as a group (94).

OADM 60 may receive an input signal comprising three wavelength channels (channel 1, channel 2, and channel 3). By application of the asymmetrical filters, the OADM 60 outputs a signal comprising the second wavelength channel 2 of the input signal. The second wavelength channel 2 may be coupled with an added channel 3 or a channel 3 received from a different degree of OADM 60 and filtered by multiplexer 52 as a group.

Figure 10:
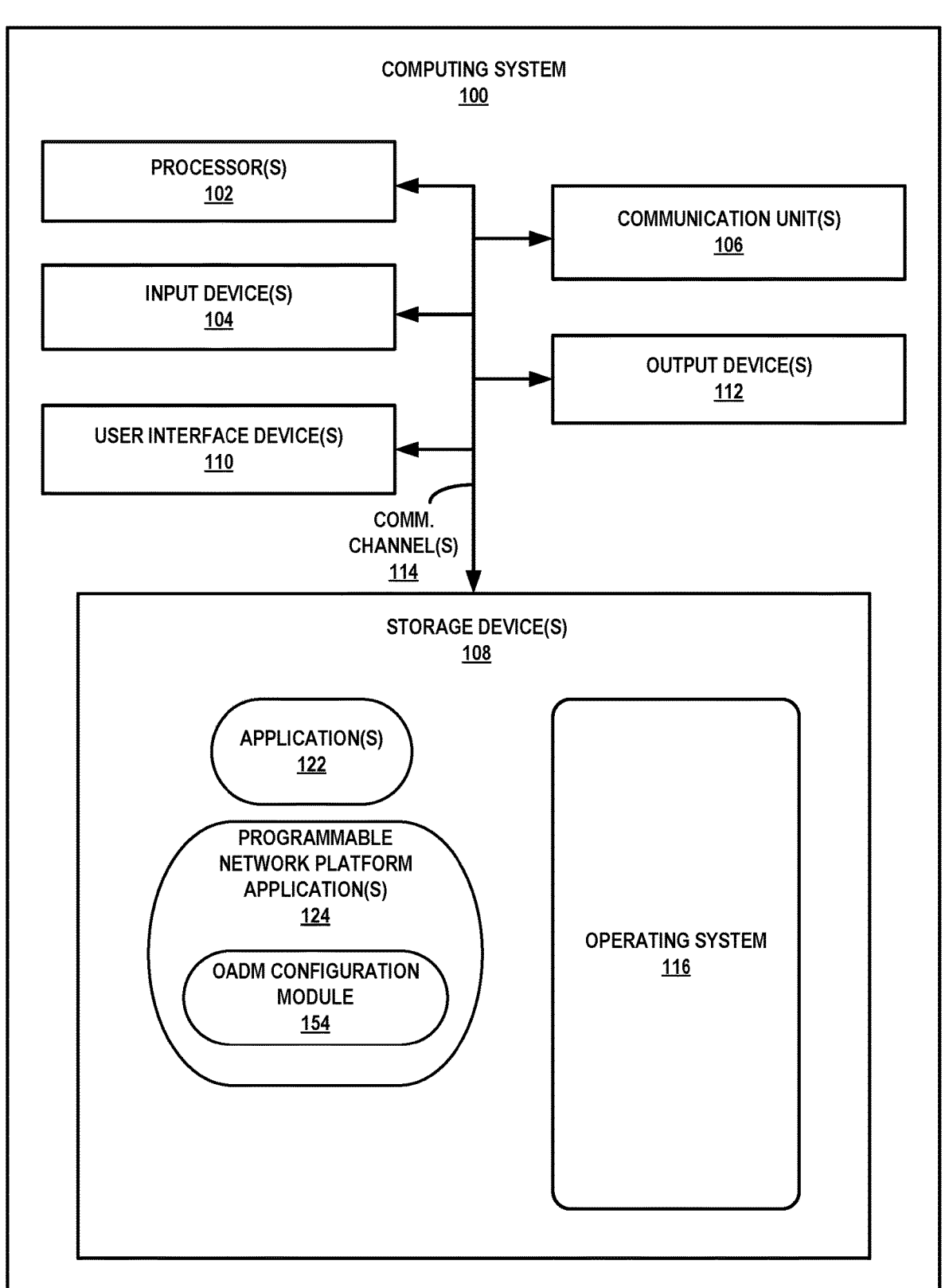
FIG. 10 is a block diagram illustrating one example of a computing device that operates in accordance with one or more techniques of the present disclosure.

FIG. 10 is a block diagram illustrating one example of a computing device that operates in accordance with one or more techniques of the present disclosure. FIG. 10 may illustrate a particular example of a server or other computing system 100 that includes one or more processor(s) 102 for executing PNP 3. Other examples of computing system 100 may be used in other instances. Although shown in FIG. 10 as a stand-alone computing system 100 for purposes of example, a computing system may be any component or system that includes one or more processors or other suitable computing environment for executing software instructions and, for example, need not necessarily include one or more elements shown in FIG. 10 (e.g., communication units 106; and in some examples components such as storage device(s) 108 may not be co-located with each other or with other components).

As shown in the specific example of FIG. 10, computing system 100 includes one or more processors 102, one or more input devices 104, one or more communication units 106, one or more output devices 112, one or more storage devices 108, and user interface (UI) device 110, and communication unit 106. Computing system 100, in one example, further includes one or more applications 122, programmable network platform application(s) 124, and operating system 116 that are executable by computing system 100. Each of components 102, 104, 106, 108, 110, and 112 are coupled (physically, communicatively, and/or operatively) for inter-component communications. In some examples, communication channels 114 may include a system bus, a network connection, an inter-process communication data structure, or any other method for communicating data. As one example, components 102, 104, 106, 108, 110, and 112 may be coupled by one or more communication channels 114.

Processors 102, in one example, are configured to implement functionality and/or process instructions for execution within computing system 100. For example, processors 102 may be capable of processing instructions stored in storage device 108. Examples of processors 102 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 108 may be configured to store information within computing system 100 during operation. Storage device 108, in some examples, is described as a computer-readable storage medium. In some examples, storage device 108 is a temporary memory, meaning that a primary purpose of storage device 108 is not long-term storage. Storage device 108, in some examples, is described as a volatile memory, meaning that storage device 108 does not maintain stored contents when the computer is turned off. Examples of volatile memories include random access memories (RAM), dynamic random access memories (DRAM), static random access memories (SRAM), and other forms of volatile memories known in the art. In some examples, storage device 108 is used to store program instructions for execution by processors 102. Storage device 108, in one example, is used by software or applications running on computing system 100 to temporarily store information during program execution.

Storage devices 108, in some examples, also include one or more computer-readable storage media. Storage devices 108 may be configured to store larger amounts of information than volatile memory. Storage devices 108 may further be configured for long-term storage of information. In some examples, storage devices 108 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing system 100, in some examples, also includes one or more communication units 106. Computing system 100, in one example, utilizes communication units 106 to communicate with external devices via one or more networks, such as one or more wired/wireless/mobile networks. Communication units 106 may include a network interface card, such as an Ethernet card, an optical transceiver, a radio frequency transceiver, or any other type of device that can send and receive information. Other examples of such network interfaces may include 3G and WiFi radios. In some examples, computing system 100 uses one or more communication unit(s) 106 to communicate with external devices.

Computing system 100, in one example, also includes one or more user interface devices 110. User interface devices 110, in some examples, are configured to receive input from a user through tactile, audio, or video feedback. Examples of user interface devices(s) 110 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 112 may also be included in computing system 100. Output device 112, in some examples, is configured to provide output to a user using tactile, audio, or video stimuli. Output device 112, in one example, includes a presence-sensitive display, a sound card, a video graphics adapter card, or any other type of device for converting a signal into an appropriate form understandable to humans or machines. Additional examples of output device 112 include a speaker, a cathode ray tube (CRT) monitor, a liquid crystal display (LCD), or any other type of device that can generate intelligible output to a user.

Computing system 100 may include operating system 116. Operating system 116, in some examples, controls the operation of components of computing system 100. For example, operating system 116, in one example, facilitates the communication of one or more applications 122 and programmable network platform application(s) 124 with processors 102, communication unit 106, storage device 108, input device 104, user interface devices 110, and output device 112 to implement PNP 3 of FIG. 1, for instance.

Application 122 and programmable network platform application(s) 124 may also include program instructions and/or data that are executable by computing system 100.

Example programmable network platform application(s) 124 executable by computing system 100 may include any one or more of an orchestration engine module, API gateway module, and sub-systems. Programmable network platform(s) applications 124 includes OADM configuration module 154.

OADM configuration module 154 may include instructions for causing computing system 100 to perform one or more of the operations and actions described in the present disclosure with respect to communicating with any one of OADMs 60 or 80 to, e.g., configure asymmetrical filters and routing within the OADMs. OADM configuration module 154 may communicate with the OADMs using a device configuration protocol. Although described as a programmable network platform application, OADM configuration module 154 may be a standalone application, a service, a library, or other software module.

Figure 11A:
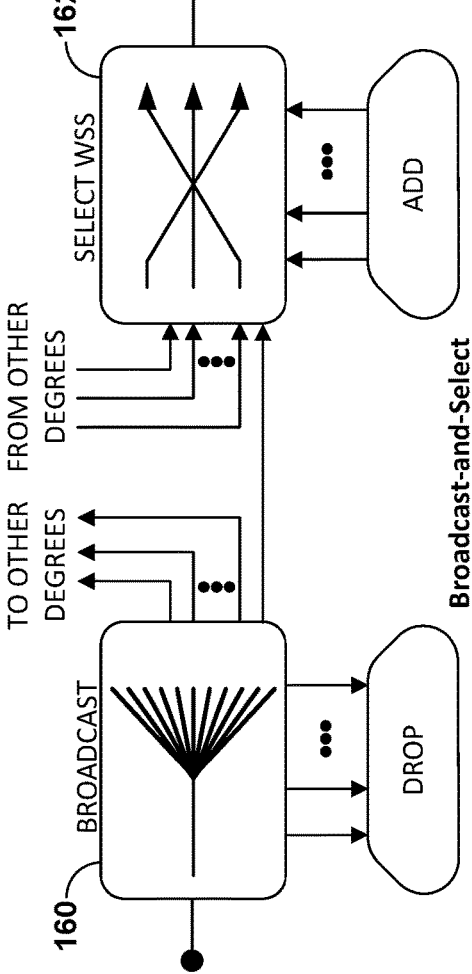
FIG. 11A is a conceptual diagram illustrating an example ROADM architecture.

FIG. 11A is a conceptual diagram illustrating an example ROADM architecture. In this example, typically referred to as Broadcast-and-Select, a broadcast passive 1×N splitter 160 is followed by a select N×1 WSS 162. Signals are broadcast (i.e., copied) onto all the splitter 160 output ports and then selectively passed or blocked at each select N×1 WSS 162 input port.

Figure 11B:
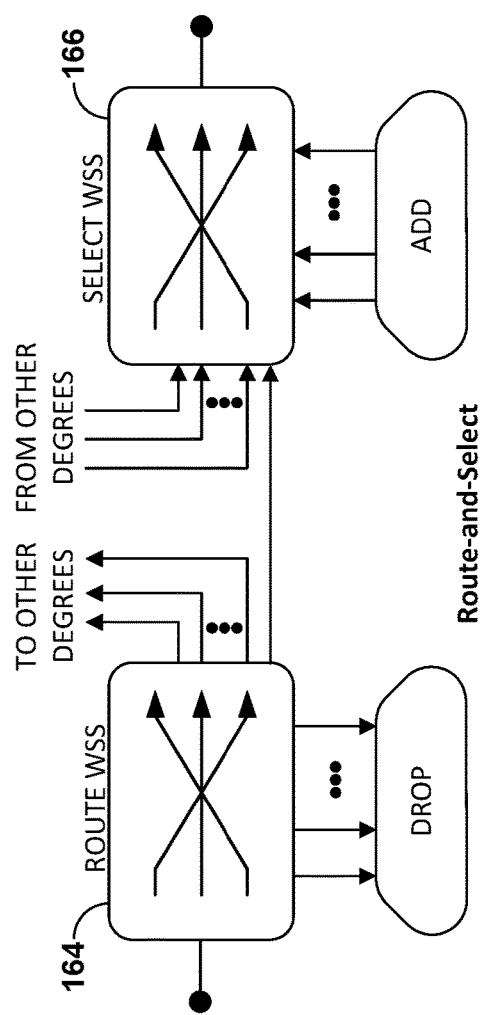
FIG. 11B is a conceptual diagram illustrating an example ROADM architecture.

FIG. 11B is a conceptual diagram illustrating another example ROADM architecture. In this example, typically referred to as Route-and-Select, a route 1×N WSS 164 is followed by select N×1 WSSs 166. Signals are selectively routed or blocked to the route 1×N WSS 164 output ports and then are selectively passed or blocked at each select N×1 WSS 166 input port.

FIG. 11C is a conceptual diagram illustrating another example ROADM architecture. In this example, typically referred to as Drop-and-Waste, an Erbium-Doped Fiber Amplifier (EDFA) 168 is applied in an optical schema of an add/drop ROADM module for coherent client signals.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. An optical add-drop multiplexer comprising:
a first input port configured to receive an input signal having a first wavelength channel, a second wavelength channel, and a third wavelength channel;
a demultiplexer having a first filter configured to:
pass the first wavelength channel and the second wavelength channel, and
filter the third wavelength channel;
a multiplexer having a second filter configured to:
pass the second wavelength channel and the third wavelength channel, and
filter the first wavelength channel; and
a first output port configured to output an output signal comprising the second wavelength channel of the input signal.

2. The optical add-drop multiplexer of claim 1, wherein the input signal comprises a first input signal, the optical add-drop multiplexer further comprising:
a second input port configured to receive a second input signal having a second wavelength channel.

3. The optical add-drop multiplexer of claim 2,
wherein the demultiplexer has a third filter configured to pass the third wavelength channel,
wherein the optical add-drop multiplexer is configured to direct the second wavelength channel of the second input signal through the second filter of the multiplexer, and
wherein the output signal output by the first output port comprises the second wavelength channel of the second input signal and the third wavelength channel of the first input signal.

4. The optical add-drop multiplexer of claim 1, further comprising:
a second output port configured to output a second output signal,
wherein the output signal comprises a first output signal, and
wherein the output signal output by the second output port comprises the second wavelength channel of the input signal.

5. The optical add-drop multiplexer of claim 4,
wherein the multiplexer comprises a first multiplexer, and
wherein a second multiplexer has a wavelength filter configured to pass the second wavelength channel and the third wavelength channel.

6. The optical add-drop multiplexer of claim 4, wherein the optical add-drop multiplexer is configured to direct the second wavelength channel of the first input signal to the second multiplexer.

7. The optical add-drop multiplexer of claim 1, wherein the input signal has a fourth wavelength channel, and wherein the demultiplexer has a third filter configured to:

pass the third wavelength channel and the fourth wavelength channel, and filter the first wavelength channel and the second wavelength channel.

8. The optical add-drop multiplexer of claim 1, wherein a filter channel center of the first filter of the demultiplexer and a multiplexer filter channel center of the second filter of the multiplexer are offset by one channel spacing.

9. The optical add-drop multiplexer of claim 1, wherein the demultiplexer and the multiplexer are each configured with filters to pass groups of wavelength channels from a plurality of wavelength channels, wherein the wavelength channels within each group are from a respective wavelength band.

10. The optical add-drop multiplexer of claim 1, wherein the demultiplexer is cascaded with one or more additional filters, and/or wherein the multiplexer is cascaded with one or more additional filters.

11. The optical add-drop multiplexer of claim 1, wherein the input signal has a third wavelength channel and a fourth wavelength channel;

a demultiplexer having a third filter configured to:

pass the third wavelength channel and the fourth wavelength channel, and a multiplexer having a fourth filter configured to:

pass a second wavelength channel and the third wavelength channel as a group, and wherein the first output port is configured to output the output signal comprising the third wavelength channel of the input signal.

12. The optical add-drop multiplexer of claim 1, wherein a free spectral range is satisfied, and wherein a channel n is connected to a port 0.

13. The optical add-drop multiplexer of claim 1, wherein the demultiplexer comprises a wavelength selective switch configured to receive configuration data to:

dynamically adjust a channel center of the first filter, and dynamically adjust a channel bandwidth of the first filter.

14. The optical add-drop multiplexer of claim 1, further comprising:

a wave selective switch and an arrayed waveguide grating that implement at least one of the first filter or the second filter.

15. An interconnection system comprising:

an optical fiber supporting an interconnection; and an optical add-drop multiplexer comprising:

a first input port configured to receive an input signal having a first wavelength channel, a second wavelength channel, and a third wavelength channel;

a demultiplexer having a first filter configured to:

pass the first wavelength channel and the second wavelength channel as a group, and filter the third wavelength channel;

a multiplexer having a second filter configured to:

pass the second wavelength channel and the third wavelength channel as a group, and filter the first wavelength channel; and a first output port configured to output, via the optical fiber, an output signal comprising the second wavelength channel of the input signal.

16. The interconnection system of claim 15, wherein the first input port is connected to a customer network located in a data center.

17. The interconnection system of claim 15, further comprising:

a controller comprising processing circuitry and configured to output configuration data to configure the first filter of the demultiplexer and the second filter of the multiplexer.

18. A controller comprising:

processing circuitry coupled to a memory, the processing circuitry and memory configured to configure an optical add-drop multiplexer comprising:

a first input port configured to receive an input signal having a first wavelength channel, a second wavelength channel, and a third wavelength channel;

a demultiplexer having a first filter configured to:

pass the first wavelength channel and the second wavelength channel as a group, and filter the third wavelength channel;

a multiplexer having a second filter configured to:

pass the second wavelength channel and the third wavelength channel as a group, and filter the first wavelength channel; and a first output port configured to output an output signal comprising the second wavelength channel of the input signal.

19. The controller of claim 18, wherein processing circuitry and memory are configured to output configuration data to configure the first filter of the demultiplexer and the second filter of the multiplexer.

20. The controller of claim 18, wherein processing circuitry and memory are configured to output configuration data to configure the optical add-drop multiplexer to direct the second wavelength channel of the first input signal to a second multiplexer of the optical add-drop multiplexer.

* * * * *